United States Patent
Naik et al.

(10) Patent No.: US 9,843,603 B2
(45) Date of Patent: Dec. 12, 2017

(54) TECHNIQUES FOR DYNAMIC ACCESS CONTROL OF INPUT/OUTPUT DEVICES

(71) Applicant: Dell Products L.P., Round Rock, TX (US)

(72) Inventors: Sharmad S. Naik, Bangalore (IN); Vivek Agarwal, Bangalore (IN); Vivek Kumar Rajendran, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 648 days.

(21) Appl. No.: 13/652,587

(22) Filed: Oct. 16, 2012

(65) Prior Publication Data

US 2014/0108670 A1    Apr. 17, 2014

(51) Int. Cl.
- *G06F 15/16* (2006.01)
- *H04L 29/06* (2006.01)
- *H04L 12/24* (2006.01)

(52) U.S. Cl.
CPC .......... *H04L 63/20* (2013.01); *H04L 41/0856* (2013.01); *H04L 63/0272* (2013.01)

(58) Field of Classification Search
None
See application file for complete search history.

(56) References Cited

U.S. PATENT DOCUMENTS

| | | | |
|---|---|---|---|
| 6,711,686 B1 | 3/2004 | Barrett | |
| 8,209,740 B1 | 6/2012 | Kulaga et al. | |
| 8,316,020 B1 * | 11/2012 | Kleinmann | G06F 17/30035 707/734 |
| 8,375,008 B1 * | 2/2013 | Gomes | G06F 17/30067 707/694 |
| 2004/0167984 A1 | 8/2004 | Herrmann et al. | |
| 2005/0132276 A1 * | 6/2005 | Panditharadhya | G06Q 10/10 715/230 |
| 2005/0165834 A1 * | 7/2005 | Nadeau | H04L 12/4641 |
| 2006/0014547 A1 * | 1/2006 | Walter | H04L 67/18 455/456.1 |
| 2008/0109448 A1 * | 5/2008 | Aboel-Nil | G06Q 10/107 |
| 2009/0063381 A1 * | 3/2009 | Chan | G06Q 10/10 706/47 |
| 2010/0107240 A1 * | 4/2010 | Thaler | H04L 63/20 726/15 |
| 2012/0023554 A1 | 1/2012 | Murgia et al. | |
| 2012/0110059 A1 | 5/2012 | Nukula et al. | |
| 2012/0158944 A1 * | 6/2012 | Tiwari | H04L 61/2007 709/224 |

(Continued)

*Primary Examiner* — Younes Naji
(74) *Attorney, Agent, or Firm* — Isidore PLLC

(57) ABSTRACT

A technique for dynamically controlling access to client input/output devices includes generating, by a client, a connection request to a central repository. In response to receiving, by the client, a grant to the connection request, an input/output device policy is downloaded from the central repository. The input/output device policy specifies one or more attributes for one or more input/output devices of the client. A user agent, executing on the client, extracts the attributes for the one or more input/output devices from the input/output device policy. The agent then applies the extracted attributes to the client to dynamically control access to the one or more input/output devices based on whether the client is inside or outside an organizational network.

20 Claims, 5 Drawing Sheets

(56) References Cited

U.S. PATENT DOCUMENTS

2012/0271904 A1\* 10/2012 Black ..................... H04L 67/06
  709/213
2013/0055044 A1\*  2/2013 Eljezovic ............ G06F 11/1004
  714/758
2014/0310776 A1\* 10/2014 Graham ................ G06F 21/575
  726/3

\* cited by examiner

User2 Properties 300

Custom Attributes

Custom Attribute 1: CADIC_ver=1
Custom Attribute 2: disableUSBStorageDeviceAccess=1
Custom Attribute 3:
Custom Attribute 4:
Custom Attribute 5:
Custom Attribute 6:
Custom Attribute 7:
Custom Attribute 8:
Custom Attribute 9:
Custom Attribute 10:
Custom Attribute 11:
Custom Attribute 12:
Custom Attribute 13:
Custom Attribute 14:
Custom Attribute 15:

OK   Cancel

FIG. 3

TECHNIQUES FOR DYNAMIC ACCESS CONTROL OF INPUT/OUTPUT DEVICES

BACKGROUND

1. Technical Field

The present disclosure generally relates to input/output devices and in particular to techniques for dynamic access control of input/output devices of information handling systems.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Active Directory™ (AD), which is included in most Windows Server™ operating systems (OSs), is a directory service for Windows™ domain networks. AD provides a central location for network administration and security. Server computers that run AD are usually referred to as AD domain controllers. An AD domain controller authenticates and authorizes all users and computers in a Windows™ domain network by assigning and enforcing security policies for all computer systems and installing and/or updating software. For example, when a user logs into a client computer system (client) that is part of a Windows™ domain network, AD checks the submitted password and determines whether the user is a system administrator or a normal user. In one or more versions, AD utilizes the lightweight directory access protocol (LDAP), Kerberos, and the domain name system (DNS).

As is known, LDAP is an application protocol for accessing and maintaining distributed directory information services over an Internet protocol (IP) network. Kerberos™ is a computer network authentication protocol that employs "tickets" to allow nodes communicating over a non-secure network to prove their identity to one another in a secure manner. That is, Kerberos™ provides for mutual authentication between a user of a client and a server computer system (server), i.e., both the client and the server verify each other's identity. As is also known, the DNS is a hierarchical distributed naming system for computers, services, or any resource connected to the Internet or a private network. The DNS associates various information with domain names assigned to each of the participating entities. A domain name service resolves domain name queries into Internet protocol (IP) addresses for the purpose of locating computer services and devices. The DNS is an essential component of the functionality of the Internet, as the DNS provides a worldwide, distributed keyword-based redirection service.

In various organizations (e.g., corporations or governmental entities), central repositories (e.g., servers that implement AD and/or LDAP) store various user information, for example, user details, groups that users belong to, and the policies that are applicable to the users and/or the groups. Policies defined in a central repository are automatically applied to each user when the user connects (via a client) to the central repository. Individual user authorization and authentication is also initiated when a user (via a client) connects to a central repository. Conventionally, an information technology (IT) administrator has employed one of two options to control the usage of input/output (I/O) devices of an organization. For example, an IT administrator may disable access to some removable I/O devices based on a group policy object (GPO). A group policy, in part, controls what users of a group can and cannot do on a computer system. For example, a group policy may: enforce a password complexity policy that prevents users from choosing an overly simple password; prohibit unidentified users from connecting to a network via remote computers or allow unidentified user to connect to a network via remote computers; block access to the Windows Task Manager™; and/or restrict access to certain folders.

As another example, basic input/output system (BIOS) configuration tools may be utilized to configure a BIOS to disable access to some removable I/O devices, prior to or following operating system (OS) start-up. It should be appreciated that every time a device control policy is updated or new I/O devices are added, a system configuration update needs to be performed across all computer systems in the organization. It should also be appreciated that the two conventional options for controlling usage of I/O devices cannot be used to control system properties dynamically.

BRIEF SUMMARY

Disclosed are a method, an information handling system, and a computer program product for dynamically controlling access to input/output devices of a client.

According to one aspect of the present disclosure, a method for dynamically controlling access to client input/output devices includes generating, by a client, a connection request to a central repository. In response to receiving, by the client, a grant to the connection request, an input/output device policy is downloaded from the central repository. The input/output device policy specifies one or more attributes for one or more input/output devices of the client. A user agent, executing on the client, extracts the attributes for the one or more input/output devices from the input/output device policy. The agent then applies the extracted attributes to the client to dynamically control access to the one or more input/output devices based on whether the client is inside or outside an organizational network.

According to another aspect of the present disclosure, an information handling system includes one or more input/output devices, a system memory, and a processor coupled to the system memory and the one or more input/output devices. The processor is configured to generate a connection request to a central repository and, in response to receiving a grant to the connection request, download an input/output device policy from the central repository. The input/output device policy specifies one or more attributes for one or more of the one or more input/output devices. The processor is further configured to extract the attributes for the one or more input/output devices from the input/output device policy. Finally, the processor is configured to apply the extracted attributes to dynamically control access to the one or more input/output devices based on whether the information handling system is inside or outside an organizational network.

A computer program product includes a computer readable storage device and computer readable program code stored on the computer readable storage device. The computer readable program code, when executed by a processor of a client, causes the processor to generate a connection request to a central repository and, in response to receiving a grant to the connection request, download an input/output device policy from the central repository. The input/output device policy specifies one or more attributes for one or more input/output devices of the client. The computer readable program code, when executed by the processor, also causes the processor to extract the attributes for the one or more input/output devices from the input/output device policy. Finally, the computer readable program code, when executed by the processor, causes the processor to apply the extracted attributes to dynamically control access to the one or more input/output devices based on whether the client is inside or outside an organizational network.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3 is an example screen shot of a graphical user interface window for receiving custom attributes of a user, according to one or more aspects of the present disclosure;

DETAILED DESCRIPTION

Figure 1:
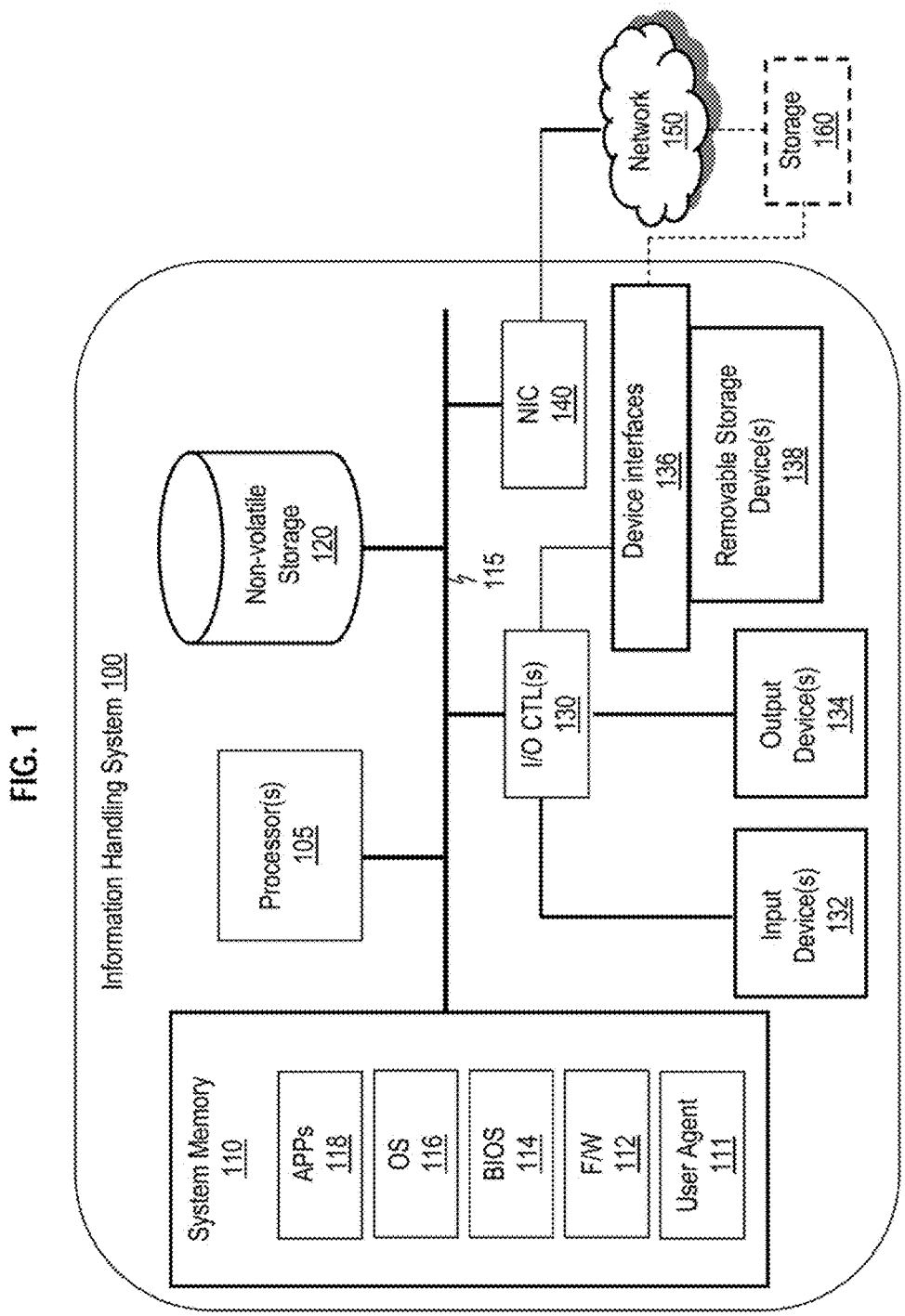
FIG. 1 provides a block diagram representation of an example information handling system within which certain aspects of the disclosure can be practiced, according to one embodiment.

The illustrative embodiments provide a method, an information handling system, and a computer program product for dynamically controlling access to input/output devices of a client.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Those of ordinary skill in the art will appreciate that the hardware components and basic configuration depicted in the following figures may vary. For example, the illustrative components within information handling system 100 are not intended to be exhaustive, but rather are representative to highlight essential components that are utilized to implement the present disclosure. For example, other devices/components may be used in addition to or in place of the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Various aspects of the disclosure are described from the perspective of an information handling system and input/output (I/O) devices for use with an information handling system. For purposes of this disclosure, an information handling system, such as information handling system 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, a personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components. As used herein the term 'client' is synonymous with a 'client computer system' or a 'client information handling system'. As is also used herein the term 'server' is synonymous with a 'server computer system' or a 'server information handling system'.

As noted above, the two conventional options for controlling usage of I/O devices cannot be used to control system properties dynamically. For example, using either of the two conventional options, a policy cannot be implemented that allows access to removable media when a client is physically connected to an organizational network (i.e., via a domain controller) and disables or removes access to the removable media when the client is outside the organizational network. In general, conventional tools provide static control for I/O devices of an organizational network. Moreover, implementing changes to group policies of AD server or OpenLDAP server only provide static control for I/O devices of an organizational network.

Given that today's workforce is highly mobile, it is desirable for organizations to have more flexible access control (which may be defined differently based on a user and/or a group of users) of I/O devices inside and outside of organizational networks. According to the present disclosure, techniques are implemented that readily facilitate enforcement of organizational policies by an information technology (IT) administrator. The disclosed techniques allow information handling systems to behave differently inside and outside of organizational (e.g., corporate) networks (e.g., printing may be enabled inside an organizational network and printing may be disabled outside the organizational network to prevent leakage of confidential documents, due to information being stored in a buffer of a non-organizational printer).

According to one or more aspects of the present disclosure, a central repository may be extended by adding one or more additional attributes or one or more custom attributes may be defined in order to control I/O devices dynamically. For example, an AD schema may be extended or a custom attribute may be defined in AD server in order to control I/O devices dynamically. A user agent running on a client can then read the newly defined attribute or the custom attribute and apply the attribute in order to control I/O devices of a client dynamically. An attribute may, for example, be applied to a specific user or users and/or a specific group or groups of users.

With reference now to the figures, and beginning with FIG. 1, there is depicted a block diagram representation of an example information handling system (IHS) 100, within which one or more of the described features of the various embodiments of the disclosure can be implemented. IHS 100 includes at least one central processing unit (CPU) or processor 105 coupled to a system memory 110 via a system interconnect 115. System interconnect 115 can be interchangeably referred to as a system bus, in one or more embodiments. Also coupled to system interconnect 115 is non-volatile storage (e.g., a non-volatile random access memory (NVRAM)) 120, within which can be stored one or more software and/or firmware modules and one or more sets of data that can be utilized during operations of IHS 100. These one or more software and/or firmware modules can be loaded into system memory 110 during operation of IHS 100. Specifically, in one embodiment, system memory 110 can include therein a plurality of such modules, including one or more of firmware (F/W) 112, basic input/output system (BIOS) 114, operating system (OS) 116, application(s) 118, and user agent 111. These software and/or firmware modules have varying functionality when their corresponding program code is executed by CPU 105 or secondary processing devices within IHS 100. In one or more embodiments, user agent 111 is preconfigured (e.g., via configuration file) to check for custom attributes or attributes of an extended AD schema in determining what I/O device functionality is available for IHS 100.

IHS 100 further includes one or more input/output (I/O) controllers 130 which support connection by and processing of signals from one or more connected input device(s) 132, such as a keyboard, mouse, touch screen, or microphone. I/O controllers 130 also support connection to and forwarding of output signals to one or more connected output devices 134, such as a monitor, display device, audio speaker(s), removable universal serial bus (USB) media, camera devices, printers, high-definition multimedia interface (HDMI) devices, video graphics array (VGA) devices, serial ports, parallel ports, FireWire ports, external serial AT attachment (eSATA) ports, and network ports such as WiFi ports, local area network (LAN) cards, and wireless data cards. Additionally, in one or more embodiments, one or more device interfaces 136, such as an optical reader, a universal serial bus (USB), a card reader, Personal Computer Memory Card International Association (PCMCIA) slot, and/or a high-definition multimedia interface (HDMI), can be associated with IHS 100. Device interface(s) 136 can be utilized to enable data to be read from or stored to corresponding removal storage device(s) 138, such as a compact disk (CD), digital video disk (DVD), flash drive, or USB media such as a flash memory card. In one or more embodiments, device interface(s) 136 can further include general purpose I/O interfaces such as $I^2C$, SMBus, and peripheral component interconnect (PCI) buses.

IHS 100 comprises a network interface controller (NIC) 140. NIC 140 enables IHS 100 and/or components within IHS 100 to communicate and/or interface with other devices, services, and components that are located external to IHS 100. These devices, services, and components can interface with IHS 100 via an external network, such as example network 150, using one or more communication protocols. Network 150 can be a local area network, wide area network, personal area network, and the like, and the connection to and/or between network and IHS 100 can be wired or wireless or a combination thereof. For purposes of discussion, network 150 is indicated as a single collective component for simplicity. However, it should be appreciated that network 150 can comprise one or more direct connections to other devices as well as a more complex set of interconnections as can exist within a wide area network, such as the Internet.

In the illustrative embodiment, network 150 also provides access to data storage facility 160, which can include a plurality of physical disks or other storage media. In an alternate embodiment, and as represented by the second set of dashed interconnecting lines, data storage facility 160 can be directly connected, via device interface(s) 136, to IHS 100 as an external storage device.

Figure 2:
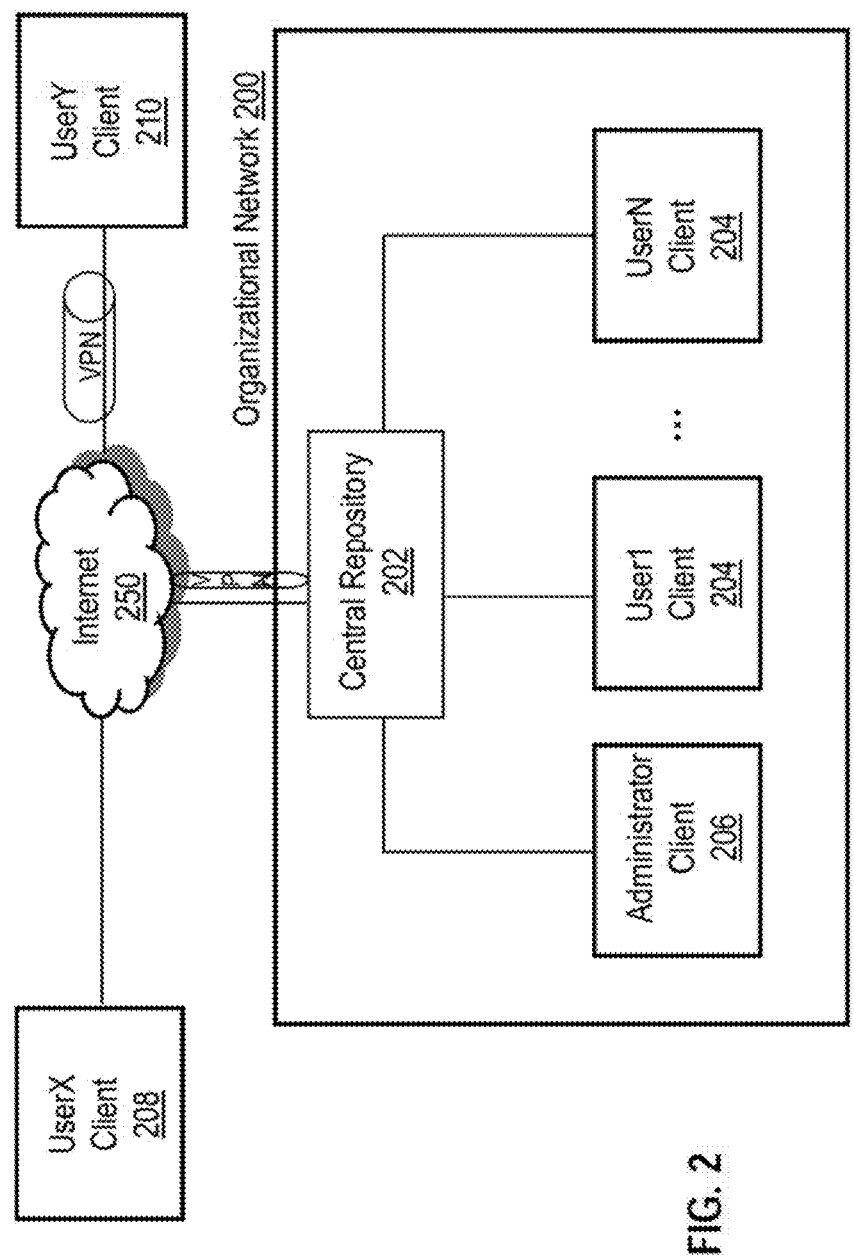
FIG. 2 illustrates an example computer network that is configured to dynamically control input/output (I/O) devices of multiple users, in accordance with one or more embodiments of the present disclosure.

With reference to FIG. 2, an example organizational network 200 is illustrated that includes a central repository 202 that is in communication with an administrator client 206 and multiple internal user clients 204, an external user client 208, and a VPN user client 210. It should be appreciated that user clients 204 are internal to organizational network 200 and user clients 208 and 210 are external to organizational network 200. VPN user client 210 is connected to organizational network 200 via a VPN tunnel established between VPN user client 210 and organizational network 200. Administrator client 206 may be utilized by an IT administrator to set user policies for individual users and group policies for user groups that control I/O devices of user clients 204, 208, and 210 based on their location with respect to organizational network 200. Individual user authorization and authentication is initiated when a user (e.g., via a client 204, 208, or 210) connects to central repository 202.

Following authorization and authentication of clients 204, 208, and/or 210 by central repository 202, policies defined by central repository 202 are downloaded and applied (by a user agent, see user agent 111 of FIG. 1) to a connected client associated with the specific user when the user connects (via client 204, 208, or 210) to central repository 202. For example, when a user utilizes external user client 208 to connect (via Internet 250) to central repository 202, an external network policy is applied to I/O devices of external user client 208. As another example, when a user utilizes internal user client 204 to connect to central repository 202, an internal network policy is applied to I/O devices of internal user client 204. Central repository 202 may, for example, be an AD server. In the described embodiments, the particular user is identified when the user logs into the organization network 200 from a specific client device (via a unique login identifier and/or user authentication method). However, according to one alternate embodiment, association of a policy to the particular user can involve identification of the connected client (e.g., via the client's machine identifier, serial number, or IP address) as being a client that is assigned to or associated with the particular user.

According to one or more embodiments of the present disclosure, access to universal serial bus (USB) storage devices (e.g., as represented by removable storage devices 138 of FIG. 1) may be disabled through the use of extended attributes or custom attributes. For example, an IT administrator may, using AD server as implemented by central repository 202, create a policy that disables USB storage devices by setting a USB storage device attribute to disable USB storage devices (e.g., set the attribute disableUSBStorageDeviceAccess=1). When a client connects to the AD server, a user agent (executing on the client) then downloads and applies the policy. Example user agent pseudo code for extracting custom attributes from a downloaded policy file is set forth below:

```
Type* myType = ___typeof(MyClass1);
// Get the members associated with MyClass1.
MemberInfo* myMembers[ ] = myType->GetMembers( );
// Display the attributes for each of the members of MyClass1.
for (int i = 0; i < myMembers->Length; i++) {
Object* myAttributes[ ] = myMembers[i]->GetCustomAttributes(true);
if (myAttributes->Length > 0) {
Console::WriteLine(S"\nThe attributes for the member {0} are: \n",
myMembers->Item[i]);
for (int j = 0; j < myAttributes->Length; j++)
Console::WriteLine(S"The type of the attribute is {0}.",
myAttributes->Item[j]);
}
}
```

In the example pseudo code, each extracted attribute includes the details of a policy to be applied (by a user agent) on a client.

According to one or more embodiments, an exemplary process for dynamically controlling access to I/O devices initially requires an IT administrator to define an organizational policy control for a specific user/group in AD server. For example, an implemented policy may grant a user of a client full access to a client USB inside an organizational network, no client USB access outside the organizational network, and limited client USB access outside the organizational network when a connection is via a virtual private network (VPN). According to one or more aspects of the present disclosure, an IT administrator installs (on organizational clients) a user agent that reads organizational policy controls during a first login to the AD server. A user agent then applies the downloaded organizational policy controls on an associated client based on whether the client is inside the organizational network, outside the organizational network, or connected to organizational network via a VPN or other form of secure access similar to VPN.

In one or more embodiments, the user agent is configured to detect policy updates and apply the updates to the client. The user agent may be, for example, preconfigured (e.g., via configuration file) to check for custom attributes or attributes of an extended AD schema. As previously mentioned, an IT administrator may add one or more custom attributes on the AD server for a specific user/group to set organizational policy controls. Alternatively, an IT administrator may extend an AD schema for specific users/groups on the AD server to set organizational policy controls. A user agent on a client can then read and enforce the policy on the client.

With reference to FIG. 3, an IT administrator may (e.g., using client 206) add and/or modify custom attributes to dynamically control access to removable USB media and other types of removable media and/or I/O devices by entering custom attributes into a customer attribute screen 300 associated with a user (i.e., in this case User2). In at least one embodiment, custom attribute screen 300 is provided by an AD server implemented within central repository 202, and the user is identified by a unique user identifier (ID) or a group ID, which can be a unique login ID or a unique identifier of the specific client device that is pre-assigned to the particular user. As is shown, a first entered custom attribute 302 provides a version number for the policy (i.e., 'CADIC_ver=1'), which allows a user agent on a client utilized by or associated with the user, User2, to determine if the client is implementing the latest policies or if a policy update is required. In the illustrated example, a second entered custom attribute 304 indicates that removable USB storage media should be disabled only when the client of the user, User2, is outside the organizational network (i.e., 'disableUSBStorageDeviceAccess=1'). At login, while authenticating with the AD server for the username/password, a user agent (running as a service on the client) is configured, for example, using the pseudo code set forth above, to check the custom attribute values for the particular user of the client.

According to various aspects of the present disclosure, a user agent is configured to extract string values and match the values against a client list to determine what action to take. It should be appreciated that different policies may be implemented for different I/O devices. For example, I/O devices (e.g., see devices 132 and 134 if FIG. 1) may include: removable USB media; camera devices; printers; high-definition multimedia interface (HDMI) devices; video graphics array (VGA) devices; serial ports; parallel ports; FireWire ports; external serial AT attachment (eSATA) ports; and network ports such as WiFi ports, local area network (LAN) cards, and wireless data cards. It is contemplated that the disclosed techniques may be extended to any I/O device. Moreover, it is contemplated that access control of I/O devices may be further refined. For example, USB devices/removable media may be limited to read-only access when outside an organizational network, while full read/write access may be provided on I/O devices inside an organizational network. As another example, vendor-based access may also be provided for USB devices.

Figure 4:
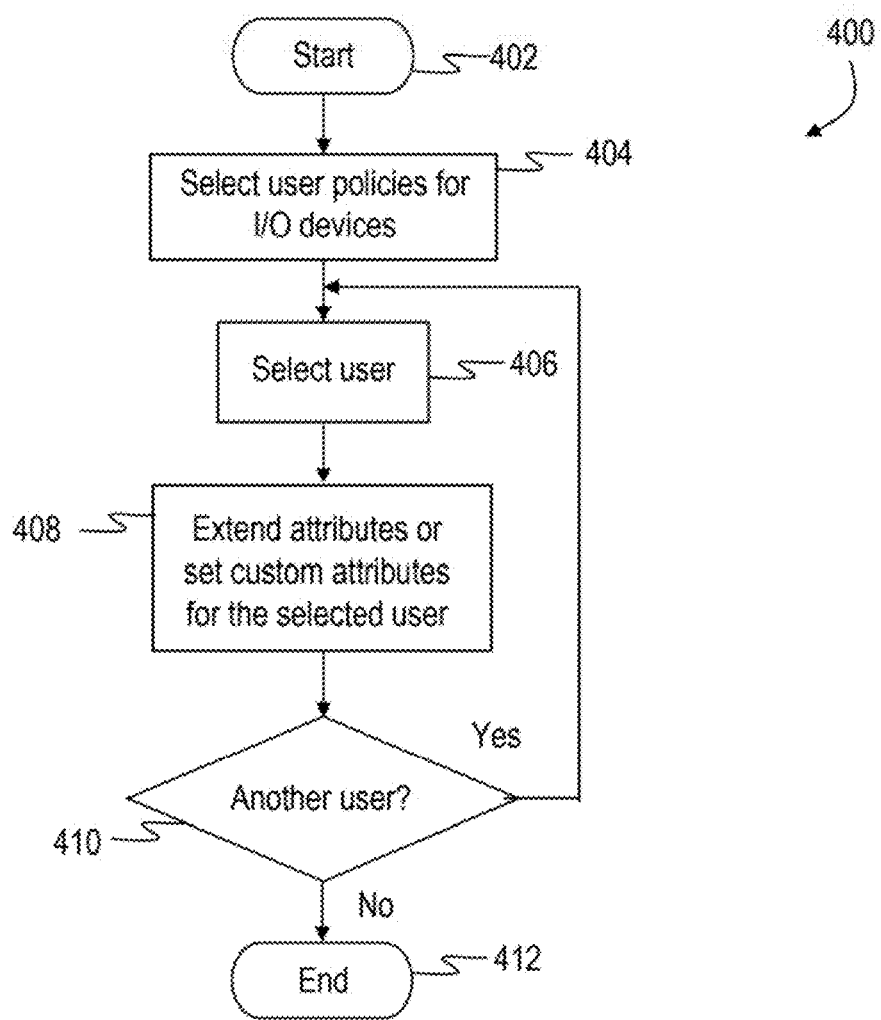
FIG. 4 is an example flow chart for an administrative process for setting attributes for a user to facilitate dynamic control of I/O devices of a client associated with the user, according to an embodiment of the present disclosure.

With reference to FIG. 4, an example administrative process 400 is illustrated for setting attributes for a user to facilitate dynamic control of I/O devices of a client based on the user, according to an embodiment of the present disclosure. Portions of process 400 may be executed by, for example, administrator client 206 and central repository 202, both of which may take the form of information handling system 100. Process 400 is initiated (by central repository 202) in start block 402 when an administrator (via administrator client 206) connects to central repository 202. Next, in block 404 the administrator (via administrator client 206) sets user policies for I/O devices by, for example, selecting an associated icon. Then, in block 406, the administrator (via administrator client 206) selects a desired user (e.g., by entering a username (e.g., User2) for the desired user in a displayed input box). Next, in block 408, the administrator (via administrator client 206) extends attributes of an AD schema or sets custom attributes (see FIG. 3) for the selected user.

The AD schema defines a number of classes and attributes that can be used by application developers to build directory-enabled applications. When the definitions are insufficient, the AD schema may be extended, for example, as follows: use a registered prefix and base OID for each class and attribute; create a unique schemaIDGuid for each class and attribute; create LDIF files for the schema installation; and use LDIFDE.exe (e.g., provided in conjunction with Windows® 2000) to load the created LDIF files. For example, the AD schema can be extended in a Windows OS using administrative tools such as the LDAP Data Interchange Format (LDIF) Directory Exchange (LDIFDE). The LDIF format has a command-line utility called "LDIFDE" that allows an IT administrator to create, modify, and delete directory objects. For example, the following sample LDIF file contents can be used to add a new attribute 'disableUSBStorageDeviceAccess' to an AD schema:

```
dn:CN=Disable-USB-Storage-Device-access-Outside-Organization,CN=Schema,
CN=Configuration, DC=myDomain, DC=anyorganization, DC=com
changetype: add
objectClass: attributeSchema
ldapDisplayName: disableUSBStorageDeviceAccess
adminDisplayName: Disable-USB-Storage-Device-access-Outside-Organization
adminDescription: Disable-USB-Storage-Device-access-Outside-Organization
attributeId: <give a unique id>
attributeSyntax: 2.5.5.8
omSyntax: 1
isSingleValued: TRUE
systemOnly: FALSE
searchFlags: 0
showInAdvancedViewOnly: TRUE
```

The value for 'attributeSyntax' is set to "2.5.5.8" to represent a Boolean value. The value for 'attributeSyntax' may alternatively be set to a string or other format. For example, the attribute "CADIC_ver" may be employed in a similar manner as discussed above with respect to the attribute "disableUSBStorageDeviceAccess". In the above example file, the attribute with an 'ldapDisplayName' of 'disableUSBStorageDeviceAccess' is enabled on the domain "myDomain.anyorganization.com".

As one example of using custom attributes, when Exchange Server 2003™ is deployed, a set-up program may be utilized to add custom attributes to the AD directory services schema. Information may be added to custom attribute fields and data searches of the fields may then be performed. In general, custom attributes may be used for information that is not already included in a user's standard AD. For example, values can be added to custom attribute fields via the following steps: click 'Start', point to 'Programs', point to 'Microsoft Exchange', and then click 'Active Directory Users and Computers'; expand 'Your_Exchange_Organization\Users'; double-click the user account that you want to add a custom attribute to; and click the 'Exchange Advanced' tab, and then click 'Custom Attributes' (a list of attributes named extensionAttributex, where 'x' is a value from 1 through 15, is then displayed); double-click an attribute, type the value for the information that you want to store, and then click 'OK'; and then close 'Active Directory Users and Computers'.

Returning to FIG. 4, in decision block 410, the administrator (via administrator client 206) may chose to terminate (e.g., by selecting a 'done' button) process 400 or continue (e.g., by selecting a 'continue' button) process 400 for another user. In decision block 410, control transfers to block 406 when the administrator chooses to continue process 400. In decision block 410, control transfers to end block 412 when the administrator chooses to terminate process 400.

An IT administrator can, for example, add a new user to a domain using the following file contents:

```
dn: CN=sampleUser, CN=Users, DC=myDomain, DC=organization,
DC=com
changetype: add
cn: sampleUser
description: Sample User
objectClass: user
sAMAccountName: sampleUser
CADIC_ver: 1
disableUSBStorageDeviceAccess: 1
```

In the above example, the attributes "CADIC_ver" and "disableUSBStorageDeviceAccess" are set to '1'. When a user agent first authenticates against the user login with the AD server, the user agent will read the file and then apply/enforce the policy on the client. To find if a user is inside the organizational network or outside the organizational network, the user agent (executing on an associated client) attempts to connect to the domain server and authenticate against the AD server. If both are successful, then the client is inside the organizational network. When connected via VPN, the client will have a tunnel to the organizational server, the gateway will be a loopback IP, and the client will be allocated two IP addresses (a first IP address for the local domain and a second IP address for the point-to-point protocol (PPP) tunnel).

According to one or more embodiments of the present disclosure, when a user agent detects an IP address change that indicates a client moved from inside an organizational network to outside an organizational network, the user agent running as a service on the client may disable one or more I/O devices to disable access to data on the I/O devices (as dictated by an AD server policy for the user/group) and/or disabling the functionality that enables the client device to output data to the I/O device. According to this aspect of the present disclosure, when the user agent detects another IP address change that indicates the client moved from outside the organizational network to inside the organizational network, the user agent running on the client may enable a previously disabled I/O device allowing access to data on the I/O devices (as dictated by the AD server policy for the user/group) and/or enabling/allowing data to be outputted to the I/O device. In general, in AD server, the number of custom attributes can currently be extended to fourteen, as one attribute is typically reserved for a policy version. The number of custom attributes available can be further extended by delimiting different attributes in each of the fourteen defined custom attributes. It should be appreciated that the disclosed techniques are not limited to AD server and may be implemented in conjunction with any number of different directory services that may provide for more or less than fourteen custom attributes.

Figure 5:
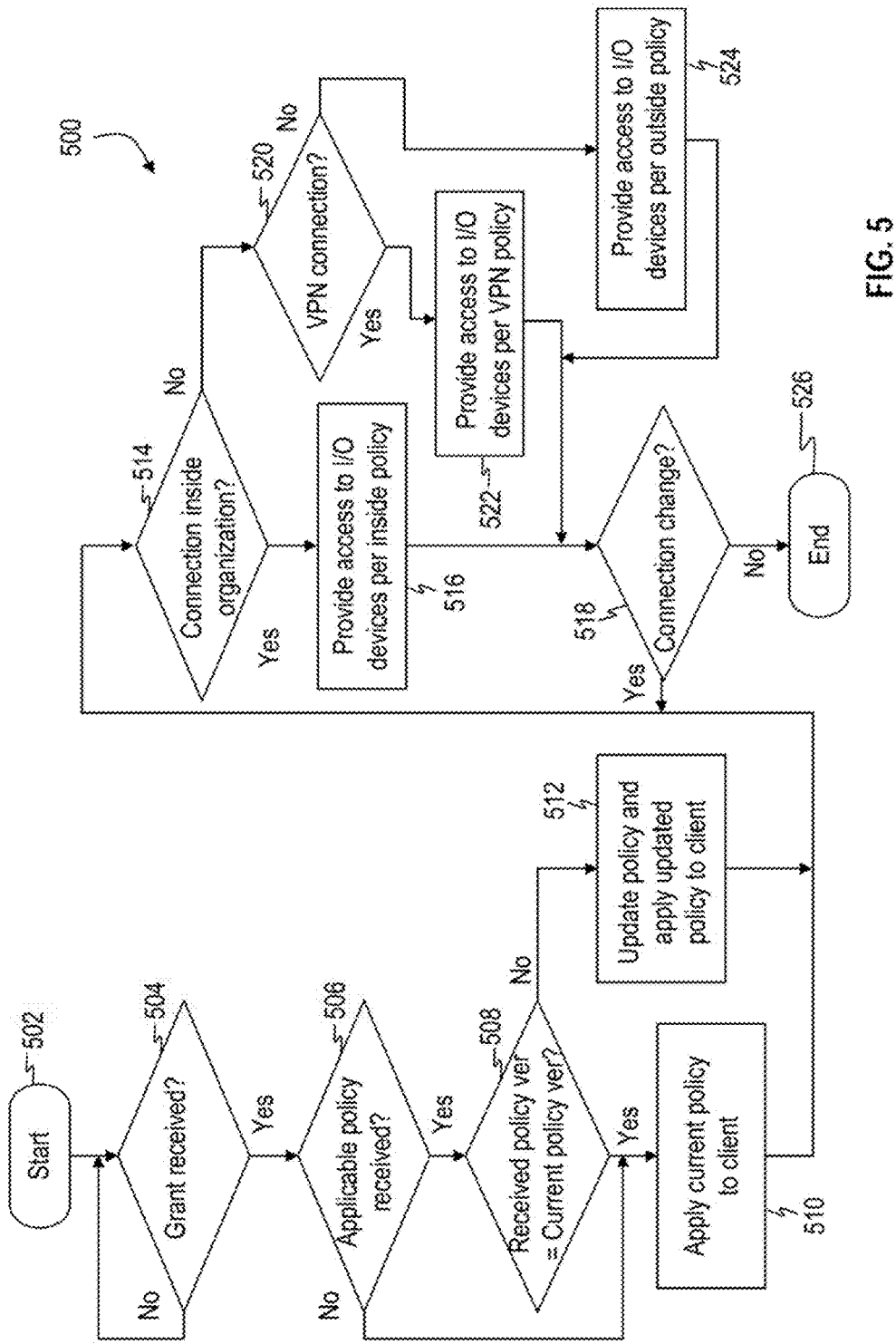
FIG. 5 is a flow chart illustrating an example process initiated by a user agent of a client to dynamically control I/O devices of the client, according to one embodiment of the present disclosure.

With reference to FIG. 5, a process 500 for dynamically controlling access to client input/output (I/O) devices, according to one or more aspects of the present disclosure, is illustrated. Process 500 may be executed by, for example, user agent 111 of clients 204, 208 and 210, each of which may take the form of information handling system 100. Process 500 is initiated at start block 502 when user agent 111 (e.g., executing on one of clients 204, 208 and 210) attempts to connect to central repository 202 by generating a connection request. Next, in decision block 504, user agent 111 determines whether a grant to the connection request has been received at an associated client. Control loops on block 504 until a grant to the connection request is received (or a timeout occurs). In response to receiving a grant to the connection request in block 504, control transfers from block 504 to decision block 506.

In block 506, user agent 111 determines whether the applicable I/O device policy has been successfully downloaded to the client. In response to the applicable I/O device policy being successfully downloaded to the client, control transfers to decision block 508 where user agent 111 determines whether a version of the I/O device policy is the same as a current I/O device policy. If the version of the received I/O device policy is the same as the current I/O device policy, control transfers from decision block 508 to block 510, where the current I/O device policy is applied to the client. If the version of the received I/O device policy is not the same as the current device policy, control transfers from decision block 508 to block 512, where the current I/O device policy is updated and the updated I/O device policy is applied to the client by agent 111.

Next, in decision block 514, user agent 111 determines (e.g., by examining an IP address) whether the connection is inside organizational network 200. In response to user agent 111 determining that the connection (e.g., between client 204 and central repository 202) is inside organizational network 200, control transfers to block 516, where access to I/O devices of client 204 is provided based on an inside I/O device policy. For example, an implemented policy may grant a user full access to I/O devices of a client that is inside organizational network 200. In response to user agent 111 determining that the connection (e.g., between client 208 and central repository 202) is not inside organizational network 200, control transfers to block 520. In block 520 user agent 111 determines whether the connection is a VPN connection. According to one embodiment, user agent 111 detects that the client is (a) outside of the organizational network and (b) connected to the organizational network via a virtual private network before implementing a VPN I/O device policy.

In response to the connection being a VPN connection, control transfers from block 520 to block 522, where access to I/O devices of the client is provided based on a VPN I/O device policy. For example, the VPN I/O device policy may provide limited client I/O device access outside organizational network 200 when a connection is via a VPN. In response to the connection not being a VPN connection in block 520, control transfers from block 520 to block 524, where access to I/O devices of the client is provided based on an outside I/O device policy. For example, the outside I/O device policy may restrict access and/or provide no access to client I/O devices outside organizational network 200.

From blocks 516, 522, and 524 control transfers to block 518, where user agent 111 determines whether a connection change has occurred. When a connection change has not occurred in block 518, control loops on block 518 while process 500 is active. In response to a connection change in block 518, control transfers from block 518 to block 514. A connection change may be indicated in various ways. For example, when user agent 111 can connect and authenticate with central repository 202 via an internal IP address, then a client is inside organizational network 200. On the other hand, when a client is connected to organizational network 200 via a VPN connection, the client will be allocated two IP addresses (a first IP address for the local domain and a second IP address for the PPP tunnel). As another example, when user agent 111 connects and authenticates with central repository 202 via an external IP address, then a client is outside organizational network 200.

Accordingly, techniques have been disclosed herein that advantageously utilize one or more attributes to specify an input/output device policy for one or more input/output devices of a client. A user agent, executing on the client, extracts the attributes for the one or more input/output devices from the input/output device policy and applies the extracted attributes to the client to dynamically control access to the one or more input/output devices based on whether the client is connected inside or outside an organizational network. The user agent may grant access by the client to the client's I/O devices, or restrict, or prevent access to the client's I/O devices based on the extracted attributes. For example, when the client is outside of the organizational network and connected via a virtual private network, the user agent may grant the client (i.e., provide the user of the client with) limited access to the one or more input/output devices.

In the above described flow charts, one or more of the method processes may be embodied in a computer readable device containing computer readable program code such that a series of steps are performed when the computer readable program code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a GPU, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, an electronic, magnetic, optical, electromagnetic, infrared, or semiconductor system, apparatus, or device, or any suitable combination of the foregoing. More specific examples (a non-exhaustive list) of the computer readable storage device include: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that stores a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of dynamically controlling access to a plurality of input/output (I/O) devices, comprising:
   generating, by a client device, a connection request to a central repository;
   in response to receiving, by the client device, a grant to the connection request, a user agent executing on the client device automatically downloading an I/O device policy from the central repository, wherein the I/O device policy includes an inside I/O device policy and an outside I/O device policy that specifies a plurality of attributes for the plurality of I/O devices of the client device, the plurality of attributes granting the client device with full access to the plurality of I/O devices of the client device while the client device is connected inside an organizational network, providing the client device with no access to the plurality of I/O devices while the client device is operating from outside the organizational network, and providing the client device with only limited access to the plurality of I/O devices while the client device is outside the organizational network but connected to the organizational network via a virtual private network (VPN), wherein the user agent is preconfigured to check for custom attributes or attributes of an extended Active Directory (AD) schema in determining what I/O device functionality is available for the client device;

extracting, by the user agent, the plurality of attributes for the plurality of I/O devices from the I/O device policy; and applying, by the user agent to the client device, the extracted plurality of attributes at the client device to dynamically control access to the plurality of I/O devices of the client device based on whether the client device is inside or outside the organizational network or connected to the organizational network via the VPN, wherein the organizational network is a computer network to which the client device connects via a network interface controller and communicates with other devices via one or more communication protocols, wherein the extracted plurality of attributes implements a policy from among granting the client device with full access to a client universal serial bus (USB) while the client device is connected inside the organizational network, providing the client device with no access to the client USB while the client device is operating from outside the organizational network, and providing the client device with only limited access to the client USB while the client device is outside the organizational network but connected to the organizational network via the VPN; wherein the plurality of I/O devices include the client USB.

2. The method of claim 1, wherein the applying, by user agent to the client device, of the extracted plurality of attributes at the client device further comprises:
determining, by the user agent, whether the client device is inside or outside of the organizational network;
granting, by the user agent based on the extracted plurality of attributes, full access by the client device to the plurality of I/O devices when the client device is inside of the organizational network;
restricting, by the user agent based on the extracted plurality of attributes, access by the client device to the plurality of I/O devices at the client device when the client device is outside of the organizational network but connected to the organizational network via the VPN, wherein the client device is provided limited access to the plurality of I/O devices; and
preventing, by the user agent based on the extracted plurality of attributes, access by the client device to the plurality of I/O devices at the client device when the client device is outside of the organizational network, wherein the client device is provided no access to the plurality of I/O devices.

3. The method of claim 2, further comprising:
attempting, by the user agent, to connect to a domain server and authenticate against an Active Directory (AD) server in order to determine if the client device is inside the organizational network or outside the organizational network;
detecting that the client device is outside of the organizational network and connected to the organizational network via the VPN; and
when the client device is outside of the organizational network and connected via the VPN, granting the client device limited access to the plurality of I/O devices based on the extracted plurality of attributes corresponding to a VPN access.

4. The method of claim 1, wherein the plurality of attributes for the plurality of I/O devices from the I/O device policy are associated with one of an extended schema of the central repository and the custom attributes of the central repository.

5. The method of claim 1, wherein the plurality of attributes for the plurality of I/O devices from the I/O device policy are associated with a single group of users, separate from another one or more users.

6. The method of claim 1, wherein the plurality of attributes for the plurality of I/O devices from the I/O device policy includes allowing access to a removable media when the client device is physically connected to the organizational network through a domain controller and disabling or removing access to the removable media when the client device is outside the organizational network and connected via the Internet.

7. The method of claim 1, wherein the plurality of attributes of the I/O device policy comprises attributes that grant a user of the client device full access to the plurality of I/O devices when the client device is connected inside of the organizational network, attributes that restrict access by the client device to the plurality of I/O devices when the client device is outside of the organizational network but connected to the organizational network via the VPN, and attributes that prevent access by the client device to the plurality of I/O devices when the client device is outside of the organizational network.

8. The method of claim 6, wherein the plurality of attributes for the plurality of I/O devices from the I/O device policy comprises one of enabling and disabling access to universal serial bus (USB) storage devices, and the method comprises:
disabling at least one USB storage device by setting a USB storage device attribute to a value which causes a disabling of the at least one USB storage device, in response to the client device connecting to a server from an IP address outside of the organizational network.

9. The method of claim 1, wherein the plurality of attributes from the I/O device policy comprises a policy for accessing one or more universal serial bus (USB) devices and a removable media, the method comprises:
limiting access to the one or more USB devices and the removable media to read-only access when the client device is outside of the organizational network but connected to the organizational network via the VPN, wherein read and write access are provided for the one or more USB devices and the removable media, in response to the client device being inside the organizational network.

10. The method of claim 9, further comprising:
when the user agent detects an IP address change that indicates the client device has moved from inside the organizational network to outside the organizational network, the user agent disabling the plurality of I/O devices to disable access to data on the plurality of I/O devices and prevent outputting of the data to the plurality of I/O devices; and when the user agent detects another IP address change that indicates the client device has moved from outside the organizational network to inside the organizational network, the user agent enabling the previously disabled plurality of I/O devices, allowing access to the data on the plurality of I/O devices and allowing storage of the data to the plurality of I/O devices.

11. The method of claim 1, further comprising:
detecting, by the user agent, an IP address change that indicates that the client device moved from inside the organizational network to outside the organizational network, the user agent running as a service on the client device to disable the plurality of I/O devices or disable access to data on the plurality of I/O devices and/or disabling a functionality that enables the client device to output the data to the plurality of I/O devices.

12. The method of claim 1, further comprising:
identifying the client device via at least one of a client machine identifier, serial number, or IP address as being the client device that is assigned to or associated with a particular user; and associating a policy to the particular user.

13. An information handling system, comprising:
a plurality of input/output (I/O) devices;
a system memory; and
a processor coupled to the system memory and the plurality of I/O devices, wherein the processor is configured to:
generate, by a client device, a connection request to a central repository;
in response to receiving a grant to the connection request, download, via a user agent executing on the information handling system, an I/O device policy from the central repository, wherein the I/O device policy includes an inside I/O device policy and an outside I/O device policy that specifies a plurality of attributes for the plurality of I/O devices, the plurality of attributes granting the client device with full access to the plurality of I/O devices of the client device while the client device is connected inside an organizational network, providing the client device with no access to the plurality of I/O devices while the client device is operating from outside the organizational network, and providing the client device with only limited access to the plurality of I/O devices while the client device is outside the organizational network but connected to the organizational network via a virtual private network (VPN), wherein the user agent is preconfigured to check for custom attributes or attributes of an extended Active Directory (AD) schema in determining what I/O device functionality is available for the client device;
extract, by the user agent, the plurality of attributes for the plurality of I/O devices from the I/O device policy; and
apply, by the user agent, the extracted plurality of attributes to dynamically control access to the plurality of I/O devices based on whether the client device is inside or outside the organizational network or connected to the organizational network via the VPN, wherein the organizational network is a computer network to which the client device connects via a network interface controller and communicates with other devices via one or more communication protocols, wherein the extracted plurality of attributes implements a policy from among granting the client device with full access to a client universal serial bus (USB) while the client device is connected inside the organizational network, providing the client device with no access to the client USB while the client device is operating from outside the organizational network, and providing the client device with only limited access to the client USB while the client device is outside the organizational network but connected to the organizational network via the VPN; wherein the plurality of I/O devices include the client USB.

14. The information handling system of claim 13, wherein the processor is further configured to:
determine whether the client device is inside or outside of the organizational network;
grant, based on the extracted plurality of attributes, full access by the client device to the plurality of I/O devices when the client device is inside of the organizational network;
restrict, based on the extracted plurality of attributes, access by the client device to the plurality of I/O devices when the client device is outside of the organizational network but connected to the organizational network via the VPN, wherein the client device is provided limited access to the plurality of I/O devices; and
prevent, based on the extracted plurality of attributes, access by the client device to the plurality of I/O devices when the client device is outside of the organizational network, wherein the client device is provided no access to the plurality of I/O devices.

15. The information handling system of claim 13, wherein the processor is further configured to:
detect that the client device is outside of the organizational network but connected to the organizational network via the VPN; and
when the client device is outside of the organizational network but connected to the organizational network via the VPN, grant the client device limited access to the plurality of I/O devices based on the extracted plurality of attributes.

16. The information handling system of claim 13, wherein the plurality of attributes are associated with at least one of an extended schema of the central repository and the custom attributes of the central repository.

17. The information handling system of claim 13, wherein the plurality of attributes of the I/O device policy comprises attributes that grant a user of the client device full access to the plurality of I/O devices when the client device is connected inside of the organizational network, attributes that restrict access to the plurality of I/O devices when the client device is outside of the organizational network but connected to the organizational network via the VPN, and attributes that prevent access to the plurality of I/O devices when the client device is outside of the organizational network.

18. The information handling system of claim 13, wherein the plurality of I/O devices include USB devices and a removable media associated with the client device are limited to read-only access when the client device is outside the organizational network but connected to the organizational network via the VPN, while full access is provided on the USB devices and the removable media, when the client device is connected inside the organizational network.

19. A computer program product, comprising:
a computer readable storage device; and
computer readable program code stored on the computer readable storage device, wherein the computer readable program code, when executed by a processor of a client device, causes the processor to:
generate a connection request to a central repository;
in response to receiving a grant to the connection request, download, via a user agent, an input/output (I/O) device policy from the central repository, wherein the I/O device policy includes an inside I/O device policy and an outside I/O device policy that specifies a plurality of attributes for a plurality of I/O devices, the plurality of attributes granting the client device with full access to the plurality of I/O devices of the client device while the client device is connected inside an organizational network, providing the client device with no access to the plurality of I/O devices while the client device is operating from outside the organizational network, and providing the client device with only limited access to the plurality of I/O devices while the client device is outside the organizational network but connected to the organizational network via a virtual private network (VPN), wherein the user agent is preconfigured to check for custom attributes or attributes of an extended Active Directory (AD) schema in determining what I/O device functionality is available for the client device;
extract, by the user agent, the plurality of attributes for the plurality of I/O devices from the I/O device policy; and
apply, by the user agent, the extracted plurality of attributes to dynamically control access to the plurality of I/O devices based on whether the client device is inside or outside the organizational network or connected to the organizational network via the VPN, wherein the organizational network is a computer network to which the client device connects via a network interface controller and communicates with other devices via one or more communication protocols, wherein the extracted plurality of attributes implements a policy from among granting the client device with full access to a client universal serial bus (USB) while the client device is connected inside the organizational network, providing the client device with no access to the client USB while the client device is operating from outside the organizational network, and providing the client device with only limited access to the client USB while the client device is outside the organizational network but connected to the organizational network via the VPN; wherein the plurality of I/O devices include the client USB.

20. The computer program product of claim 19, wherein the computer readable program code, when executed by the processor of the client device, further causes the processor to:
determine whether the client device is inside or outside of the organizational network;
grant, based on the extracted plurality of attributes, full access by the client device to the plurality of I/O devices when the client device is inside of the organizational network;
prevent, based on the extracted plurality of attributes, access by the client device to the plurality of I/O devices when the client device is outside of the organizational network, wherein the client device is provided no access to the plurality of I/O devices;
detect that the client device is outside of the organizational network and connected to the organizational network via the VPN; and
when the client device is outside of the organizational network and connected via the VPN, grant the client device limited access to the plurality of I/O devices based on the extracted plurality of attributes;
wherein the plurality of attributes of the I/O device policy comprise attributes that grant a user of the client device full access to the plurality of I/O devices when the client device is connected inside of the organizational network, attributes that restrict access to the plurality of I/O devices when the client device is outside of the organizational network but connected to the organizational network via the VPN, and attributes that prevent access to the plurality of I/O devices when the client device is outside of the organizational network.

* * * * *